US008169536B2

(12) United States Patent
Guo et al.

(10) Patent No.: US 8,169,536 B2
(45) Date of Patent: May 1, 2012

(54) OPTICAL IMAGING DEVICE, AND LENS CONTROL METHOD AND APPARATUS

(75) Inventors: Junrong Guo, Pudong District (CN); Xiaobo Zhou, Pudong District (CN)

(73) Assignee: Sony Corporation, Tokyo (JP)

( * ) Notice: Subject to any disclaimer, the term of this patent is extended or adjusted under 35 U.S.C. 154(b) by 360 days.

(21) Appl. No.: 12/510,636

(22) Filed: Jul. 28, 2009

(65) Prior Publication Data

US 2010/0026828 A1 Feb. 4, 2010

(30) Foreign Application Priority Data

Jul. 31, 2008 (CN) .......................... 2008 1 0144079

(51) Int. Cl.
*H04N 5/225* (2006.01)
*H04N 5/235* (2006.01)
*G03B 17/00* (2006.01)
(52) U.S. Cl. .................... 348/363; 348/360; 396/529
(58) Field of Classification Search .................. 348/360, 348/361, 372, 363, 366; 396/529
See application file for complete search history.

(56) References Cited

U.S. PATENT DOCUMENTS

| 4,959,728 | A | * | 9/1990 | Takahashi et al. | ............ 348/363 |
| 5,057,927 | A | * | 10/1991 | Hieda | ............ 348/360 |
| 5,087,978 | A | * | 2/1992 | Hieda | ............ 348/360 |
| 5,325,149 | A | * | 6/1994 | Kawahara | ............ 396/259 |
| 5,953,062 | A | * | 9/1999 | Sugimori et al. | ............ 348/364 |
| 6,172,709 | B1 | * | 1/2001 | Yamano et al. | ............ 348/360 |
| 6,407,774 | B1 | * | 6/2002 | Mabuchi et al. | ............ 348/360 |
| 6,546,206 | B2 | * | 4/2003 | Murakami | ............ 396/529 |
| 6,829,010 | B1 | * | 12/2004 | Suzuki | ............ 348/335 |
| 6,947,092 | B1 | * | 9/2005 | Nagata et al. | ............ 348/360 |
| 7,151,570 | B2 | * | 12/2006 | Kaneda | ............ 348/360 |
| 7,471,331 | B2 | * | 12/2008 | Kaneda | ............ 348/360 |
| 7,593,634 | B2 | * | 9/2009 | Terada | ............ 396/257 |
| 7,787,043 | B2 | * | 8/2010 | Moriya | ............ 348/335 |
| 7,929,046 | B2 | * | 4/2011 | Okamura | ............ 348/360 |
| 2003/0048374 | A1 | * | 3/2003 | Minakuti et al. | ............ 348/360 |
| 2004/0179132 | A1 | * | 9/2004 | Fujino et al. | ............ 348/363 |
| 2006/0050170 | A1 | * | 3/2006 | Tanaka | ............ 348/360 |
| 2008/0111900 | A1 | | 5/2008 | Numako et al. | |
| 2009/0268082 | A1 | * | 10/2009 | Shibuno et al. | ............ 348/360 |
| 2010/0202771 | A1 | * | 8/2010 | Moriya et al. | ............ 396/661 |
| 2011/0164170 | A1 | * | 7/2011 | Okamura | ............ 348/360 |

FOREIGN PATENT DOCUMENTS

| JP | 2001-311978 | 11/2001 |
| JP | 2006-65080 | 3/2006 |

* cited by examiner

*Primary Examiner* — John Villecco
(74) *Attorney, Agent, or Firm* — Oblon, Spivak, McClelland, Maier & Neustadt, L.L.P.

(57) ABSTRACT

The invention provides an optical imaging device, which includes: an input unit, adapted to receive lens category information that is inputted; a storage unit, adapted to store at least one lens control model; and a control unit, adapted to select, according to the lens category information that is inputted from the input unit, a corresponding lens control model from the storage unit, and to apply to a lens a control signal which control signal corresponds to a current status of the lens. The invention also provides a lens control method and apparatus. The optical imaging device of the invention can control and adjust various categories of lenses, thus effectively avoiding the problem of iris hunting.

10 Claims, 8 Drawing Sheets

|       | -0.3EV | -0.6EV | -1.0EV | -1.3EV | -1.6EV | -2.0EV | -2.3EV | -2.6EV | -3.0EV |
|-------|--------|--------|--------|--------|--------|--------|--------|--------|--------|
| 1/30  | Mode 1 | Mode 1 | Mode 2 | Mode 2 | Mode 3 | Mode 3 | Mode 4 | Mode 4 | Mode 5 |
| 1/50  |        |        | Mode 1 | Mode 1 | Mode 2 | Mode 2 | Mode 3 | Mode 3 | Mode 4 |
| 1/60  |        |        | Mode 1 | Mode 1 | Mode 2 | Mode 2 | Mode 3 | Mode 3 | Mode 4 |
| 1/100 |        |        |        |        | Mode 1 | Mode 1 | Mode 2 | Mode 2 | Mode 3 |
| 1/250 |        |        |        |        |        |        |        | Mode 1 | Mode 1 |
| 1/500 |        |        |        |        |        |        |        |        |        |

Fig.9

|        | 158 | 159 | 160 | 161 | 162 | 163 | 164 |
|--------|-----|-----|-----|-----|-----|-----|-----|
| Mode 1 |     |     |     |     | -1  | -2  | -2  |
| Mode 2 |     |     |     | -1  | -2  | -3  | -4  |
| Mode 3 |     |     | -1  | -1  | -2  | -4  | -6  |
| Mode 4 |     |     | -1  | -2  | -3  | -5  | -7  |
| Mode 5 |     |     | -1  | -2  | -4  | -6  | -8  |

Fig.10

OPTICAL IMAGING DEVICE, AND LENS CONTROL METHOD AND APPARATUS

CROSS-REFERENCE TO RELATED APPLICATIONS

This application claims priority to Chinese Patent Application No. 200810144079.X filed Jul. 31, 2008, which is incorporated herein by reference as if reproduced in its entirety.

FIELD OF THE INVENTION

The present invention relates to an optical imaging device, and a lens control method and apparatus.

BACKGROUND OF THE INVENTION

An optical imaging device (e.g. a video camera, a digital camera, etc.) is typically equipped with a lens. In order to control the amount of light incident on the light sensitive surface inside the optical imaging device via the lens, an iris is mounted inside the lens. The extent to which the iris is opened or closed corresponds to a different amount of incoming light. In the existing optical imaging device, the extent to which the iris is opened or closed is determined by a control voltage provided from the imaging device to the iris.

For example, when in operation, the video camera calculates the brightness of each frame of image and compares the brightness with a target brightness value having been set to obtain a relative brightness value. The relative brightness value, which may be in the form of a ratio in dB, represents a difference between the current brightness level (Video level) and the target brightness value. Then, the control voltage of the iris is adjusted in real time according to an iris control model stored in advance in a storage unit of the video camera, so as to change the amount of incoming light of the iris. The so-called iris control model, as illustrated in FIG. 1, may be a functional relationship between iris control voltage offsets and relative brightness values, which functional relationship is derived from the characteristics of the iris. When the relative brightness value is changed, the video camera can determine an iris control voltage offset from the iris control model, thus to adjust the iris control voltage to make the relative brightness value to be 0, i.e. back to the origin (a convergence target) of FIG. 1.

In another example, U.S. Pat. No. 5,739,854 discloses an apparatus being capable of adjusting in real time the amount of incoming light. In this apparatus, a detection unit is arranged to detect in real time the extent to which the iris is opened or closed, and to transport detected information to a circuit control unit; the circuit control unit performs certain processing for the information, and further transfers the processing result to an iris control unit; and the iris control unit adjusts the extent to which the iris is opened or closed according to an instruction of the circuit control unit. When there are multiple irises, a synchronization component is further arranged in the apparatus to synchronize control signals that are outputted from the iris control unit.

However, the iris control model stored in advance in the existing optical imaging device is set with respect to specific lens of the original manufacturer. In fact, lenses produced by different manufacturers may be different, and characteristics of their irises may also be different. Thus, the optical imaging device fails to be adaptive to those lenses of different categories, and is greatly limited in usage. For example, when a lens is replaced by that of a different category or that from a different manufacturer, due to the mismatch of the iris with the iris control model preset in the storage unit, a phenomenon that different irises respond at different rates to the same control voltage may occur, thus a problem of iris hunting may arise.

Furthermore, in the case that the curve of the iris control model is too steep, i.e. the control voltage offset corresponding to the relative brightness value is too large, the control voltage may also be large, thus the iris may be caused to act too fast. When the speed at which the iris acts exceeds the range that can be controlled by the optical imaging device, fast iris hunting may occur. As illustrated in FIG. 2, when fast iris hunting occurs, for the reason that the iris is opened or closed variably, the current brightness level (Video Level) may vary significantly with time.

In the existing optical imaging device, there are similar problems in controlling other elements or performances of the lens, thus leading to limited categories of lenses being suitable to be mounted in the optical imaging device.

SUMMARY OF THE INVENTION

The invention provides an optical imaging device, which includes: an input unit, adapted to receive lens category information that is inputted; a storage unit, adapted to store at least one lens control model; and a control unit, adapted to select, according to the lens category information that is inputted from the input unit, a corresponding lens control model from the storage unit, and to apply to a lens a control signal which control signal corresponds to a current status of the lens.

The invention further provides a lens control method, which includes: selecting, according to lens category information, a corresponding lens control model; and applying to, according to the lens control model, a lens a control signal which control signal corresponds to a current status of the lens.

The invention further provides a lens control apparatus, which includes: a storage unit, adapted to store at least one lens control model; a selection unit, adapted to select, according to lens category information, a corresponding lens control model from the storage unit, and to transfer a signal of the lens control model to an operation unit; and the operation unit, adapted to apply to, according to the lens control model, a lens a control signal which control signal corresponds to a current status of the lens.

Being compared with the prior art, the invention has advantages as follows:

The optical imaging device according to the invention includes a storage unit in which the lens control model is stored, lenses of different categories can be controlled and adjusted, and the problem of iris hunting is effectively avoided.

The lens control method according to the invention includes dynamic adjusting the lens control model, so that when a conventional shutter speed is used and exposure compensation is enabled, the various kinds of lenses can be adaptive to more implementation scenarios.

The lens control apparatus according to the invention includes an adjustment unit which adjusts several points being far away from the origin in the lens control model. This can avoid occurrence of too slow iris action around the convergence target, thus perfectly dealing with the contradiction between slow iris hunting and exposure compensation.

BRIEF DESCRIPTION OF THE DRAWINGS

FIG. 9 to FIG. 10 are schematic diagrams illustrating an embodiment of the lens control method according to the invention being used for dynamically adjusting a lens control model.

DETAILED DESCRIPTION OF THE EMBODIMENTS

Figure 3:
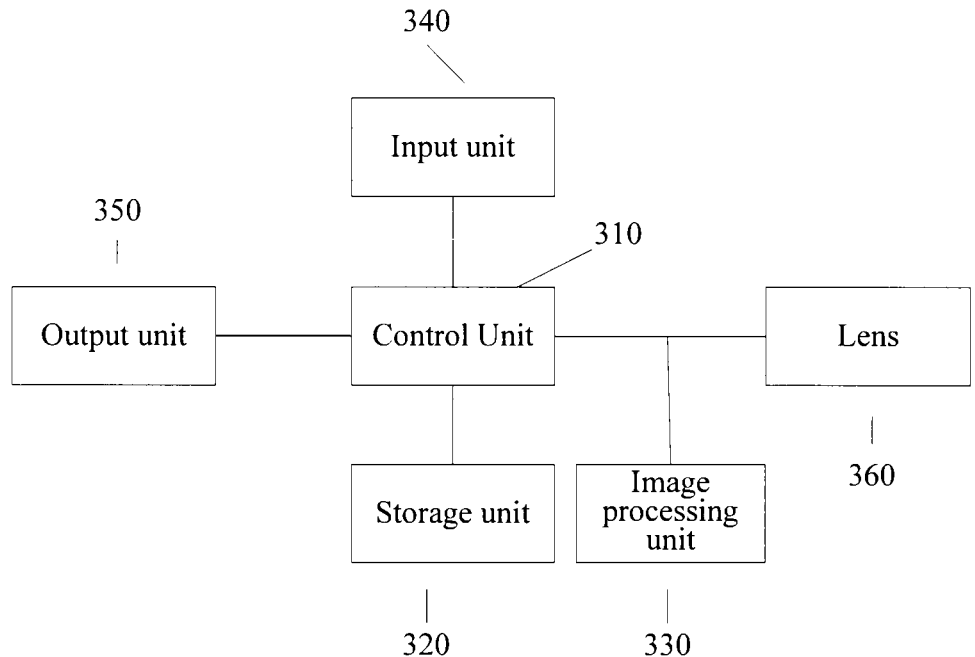
FIG. 3 is a schematic diagram illustrating an embodiment of an optical imaging device according to the invention.

Referring to FIG. 3, in an embodiment, an optical imaging device may be adaptive to lenses 360 of various categories, which includes: a control unit 310, a storage unit 320, an image processing unit 330, an input unit 340 and an output unit 350.

Particularly, the input unit 340 is adapted to receive information inputted from the outside. In an embodiment, the information includes lens category information as well as outside inputted information.

The input unit 340 may be implemented in various manners. In an embodiment, the information may be received by way of a key, a switch, a jumper, etc. In another embodiment, the information may alternatively be inputted via an interface displayed on the body of the device. In a further embodiment, the information may alternatively be inputted using an On Screen Display (OSD). In a further embodiment, the information inputted by way of command lines from a remote log-in client may alternatively be received. In a further embodiment, the information may alternatively be inputted by remotely manipulating a Graphic User Interface (GUI).

The storage unit 320 is adapted to store at least one lens control model.

The storage unit 320 may be one or a combination of a flash memory, a Read Only Memory (ROM), a Random Access Memory (RAM), a Static Random Access Memory (SRAM), an Erasable Programmable Read Only Memory (EPROM) and an Electrically Erasable Programmable Read Only Memory (EEPROM).

The lens control model represents a relationship between a lens control signal and a lens status, thus the optical imaging device can apply a corresponding lens control signal to the lens according to the lens status.

In an embodiment, the lens control model may include an iris control model adapted to represent a relationship between an iris control signal and an iris status.

Figure 1:
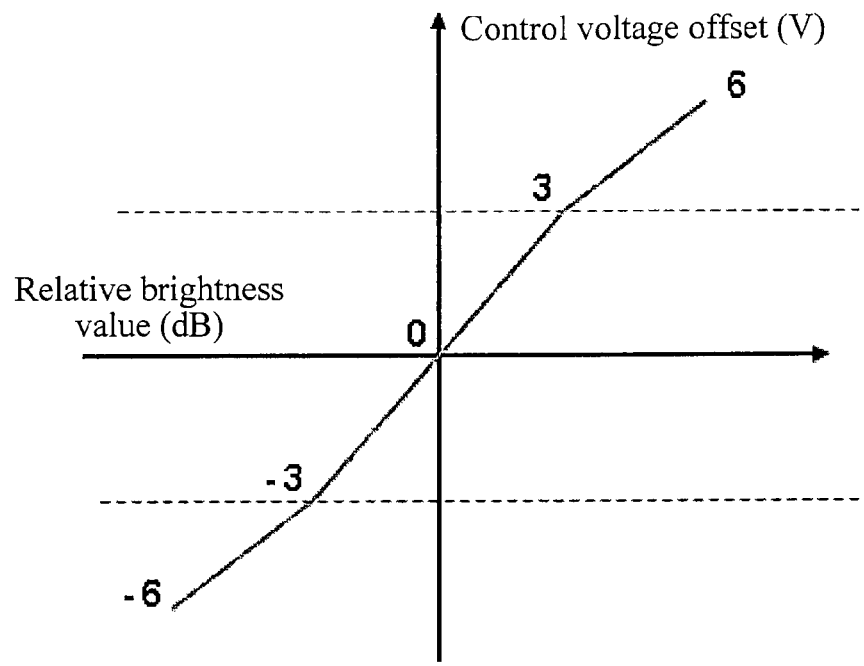
FIG. 1 is a schematic diagram illustrating an embodiment of a lens control model.
Figure 2:
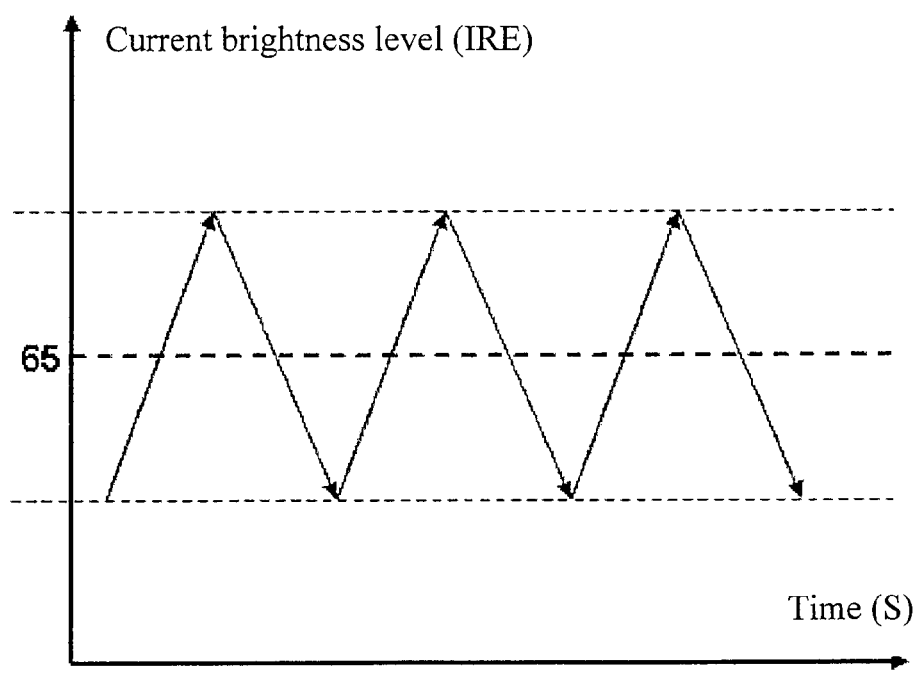
FIG. 2 is a diagram illustrating a relationship with a current brightness level (Video Level) being changed with time when iris hunting occurs.

In an embodiment, the iris control model may particularly be an iris control voltage curve. FIG. 1 illustrates an iris control voltage curve with the horizontal axis representing relative brightness values, and each of the relative brightness values (MIRISESCL), which may be in the form of a ratio in dB ($\Delta VL$), is a difference between a current brightness level (Video level) and a target brightness value and can be transformed using the equation (1):

$$MIRISSCL \times 8 = \Delta VL(dB) \times 1024/6.02 \qquad (1)$$

As illustrated in FIG. 1, the larger the difference between the current brightness level (Video Level) and the target brightness value (i.e. the relative brightness value is larger), the larger the control voltage offset.

The iris control model may be not limited to the iris control voltage curve described above. In an embodiment, the iris control model may alternatively be an iris control current curve particularly adapted to represent a functional relationship between an iris control current and a current brightness value.

The lens 360 is adapted to obtain an image from the outside.

The image processing unit 330 is adapted to perform further processing for the image signal obtained by the lens 360.

The output unit 350 is adapted to implement an output of the optical imaging device.

The control unit 310 is adapted to select a corresponding lens control model from the storage unit 320 according to the lens category information that is outputted by the input unit 340, and to apply to the lens 360 a control signal which control signal corresponds to the current status of the lens. In an embodiment, the control unit 310 may control the extent to which the iris contained in the lens is opened or closed.

Figure 4:
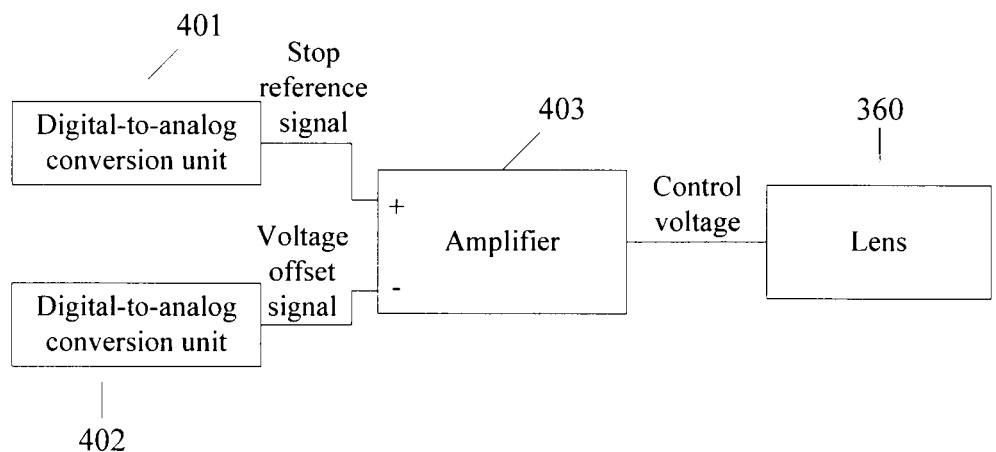
FIG. 4 to FIG. 6 are schematic diagrams illustrating embodiments of a control unit contained in the optical imaging device according to the invention.
Figure 5:
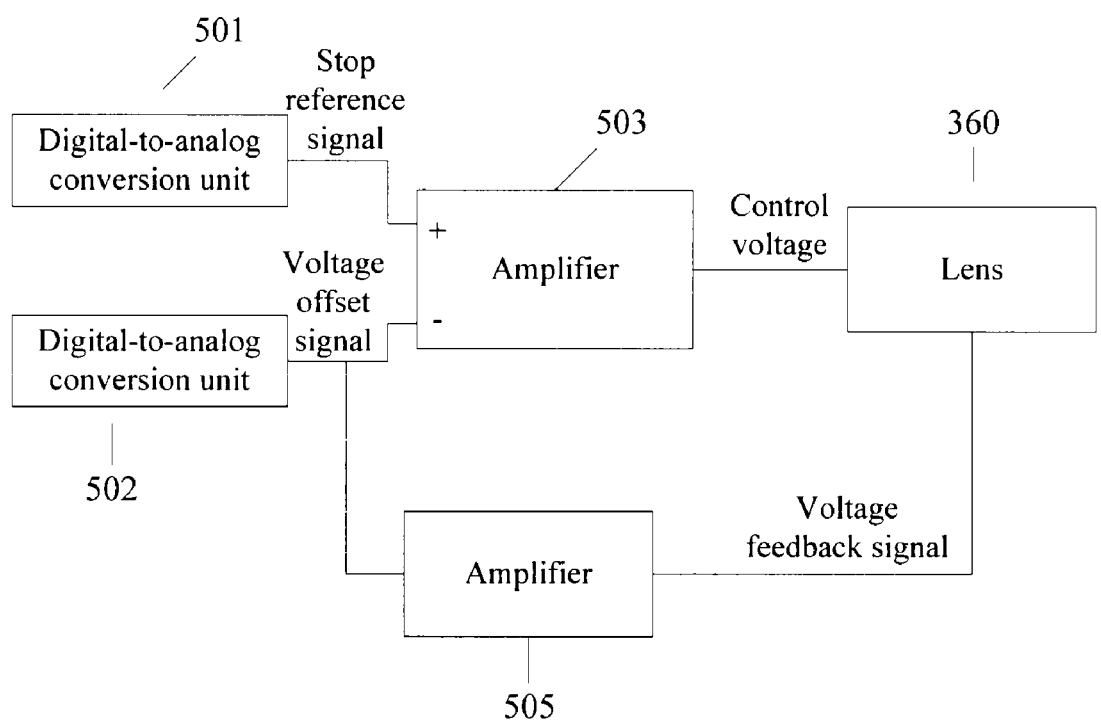
Figure 6:
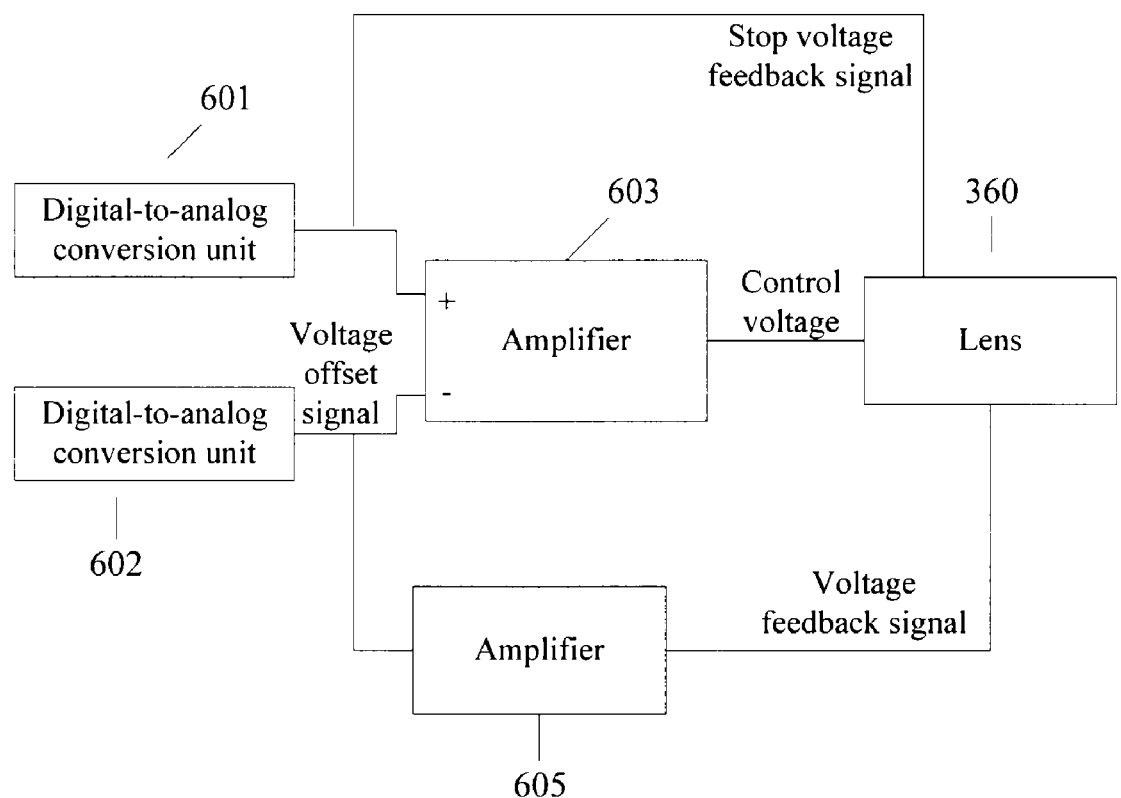

In a specific implementation, the control signal provided from the control unit 310 can be applied to the lens 360 after being processed by a lens control circuit (referring to FIG. 4, FIG. 5 and FIG. 6).

In an embodiment, the control signal provided from the control unit 310 includes a digital signal of the voltage offset, and a stop reference signal. As illustrated in FIG. 4, the lens control circuit particularly includes digital-to-analog conversion units 401 and 402, and an amplifier 403. The digital-to-analog conversion unit 401 is adapted to convert the digital signal of the stop reference signal into an analog signal, and the digital-to-analog conversion unit 402 is adapted to convert the digital signal of the voltage offset into an analog signal. The amplifier 403 is adapted to perform operation amplification for the analog values of the stop reference signal and the voltage offset signal, and to output the control voltage to adjust the lens 360.

In another embodiment, as illustrated in FIG. 5, the lens control circuit particularly includes digital-to-analog conversion units 501 and 502, and amplifiers 503 and 505. The digital-to-analog conversion unit 501 is adapted to convert the digital signal of the stop reference signal into an analog signal, and the digital-to-analog conversion unit 502 is adapted to convert the digital signal of the voltage offset into an analog signal. The amplifier 503 is adapted to perform operation amplification for the analog values of the stop reference signal and the voltage offset signal, and to output the control voltage to adjust the lens 360. The lens 360 outputs in real time a voltage feedback signal to the amplifier 505, and the amplifier 505 amplifies the feedback signal and then feeds it back to the voltage offset signal input end of the amplifier 503. Using the circuit structure having a negative feedback can more accurately adjust the control voltage outputted from the amplifier 503, thus to effectively control the lens 360.

In a further embodiment, as illustrated in FIG. 6, the lens control circuit particularly includes digital-to-analog conversion units 601 and 602, and amplifiers 603 and 605. The digital-to-analog conversion unit 601 is adapted to convert the digital signal of the stop reference signal into an analog signal, and the digital-to-analog conversion unit 602 is adapted to convert the digital signal of the voltage offset into an analog signal. The amplifier 603 is adapted to perform operation amplification for the analog values of the stop reference signal and the voltage offset signal, and to output the control voltage to adjust the lens. The lens 360 outputs in real time a voltage feedback signal to the amplifier 605, and the amplifier 605 amplifies the feedback signal and then feeds it back to the voltage offset signal input end of the amplifier 603. The lens 360 further outputs a stop voltage feedback signal to the stop reference signal input end of the amplifier 603. In this embodiment, two feedback signals are used to adjust the control voltage outputted from the amplifier 603, thus to accurately control the action of the lens 360.

The operation principle of the lens control circuit is analyzed in detail hereinbelow with the lens control circuit illustrated in FIG. 5 being taken as an example. It is assumed that $V_{IRIS\_DRV}$ denotes the control voltage for controlling the lens 360, and thus there is always a certain voltage $V_{STOP}$ that the iris contained in the lens is in a stop status when $V_{IRIS\_DRV}=V_{STOP}$. When $V_{IRIS\_DRV}$ is below $V_{STOP}$, the iris performs a closing action; otherwise, it performs an opening action. It is assumed that $V_1$ denotes the stop reference signal, $V_2$ denotes the voltage offset, and $V_3$ denotes the voltage feedback signal, thus when the circuit reaches a steady state, the control voltage $V_{IRIS\_DRV}$ can be derived using the equation (2):

$$V_{IRIS\_DRV}=G_1 \cdot V_1 - G_2 \cdot V_2 - G_3 \cdot V_3 \quad (2)$$

In the equation (2), $G_1$, $G_2$ and $G_3$ respectively denote gains of the circuit for each of the signals when in the steady state. As analyzed in the above, when $G_1$, $G_2$, $G_3$ and the stop reference voltage $V_1$ are fixed, the control voltage $V_{IRIS\_DRV}$ of the lens can be changed by adjusting the voltage offset $V_2$.

More particularly, the lens control circuit illustrated in FIG. 5 may be further improved. At a certain frequency, when the phase a and the gain $G_a$ of the amplifier 503, the phase b and the gain $G_b$ of the lens 360, and the phase c and the gain $G_c$ of the amplifier 505 meet the following conditions, self-excited oscillation may occur in the lens control circuit, and the iris may be made out of control:

$$|G_a| \cdot |G_b| \cdot |G_c| \geqq 1 \quad \text{Condition 1}$$

$$a+b+c=2n\pi \text{ (n is an integer)} \quad \text{Condition 2}$$

Therefore, in an embodiment, the gain $G_a$ of the amplifier 503 may be decreased to break the oscillation condition, so that no self-excited oscillation occurs in the circuit. In another embodiment, the gain $G_c$ of the amplifier 505 may be decreased to break the oscillation condition, so that no self-excited oscillation occurs in the circuit. In a further embodiment, a capacitance inside the amplifier 505 may be modified (i.e. c is changed) to maintain the original frequency characteristics of the amplifier 505, so that no self-excited oscillation occurs in the circuit.

Figure 7:
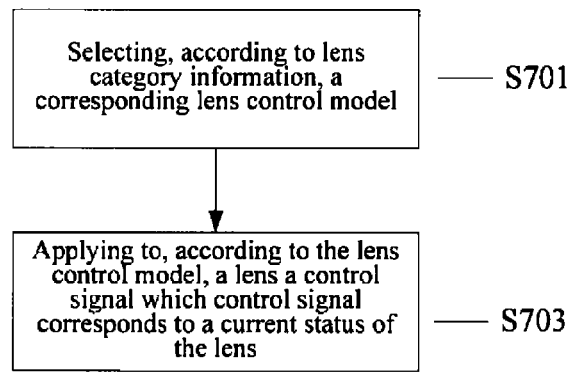
FIG. 7 is a schematic diagram illustrating a simplified flow of a lens control method according to the invention.

Referring to FIG. 7, in an embodiment, a lens control method particularly includes: S701—selecting, according to lens category information, a corresponding lens control model; and S703—applying to, according to the lens control model, a lens a control signal which control signal corresponds to a current status of the lens.

The lens control model represents a relationship between a lens control signal and a lens status, thus the optical imaging device can apply a corresponding lens control signal to the lens according to the lens status.

In an embodiment, the lens control model may include an iris control model adapted to represent a relationship between an iris control signal and an iris status.

Figure 8:
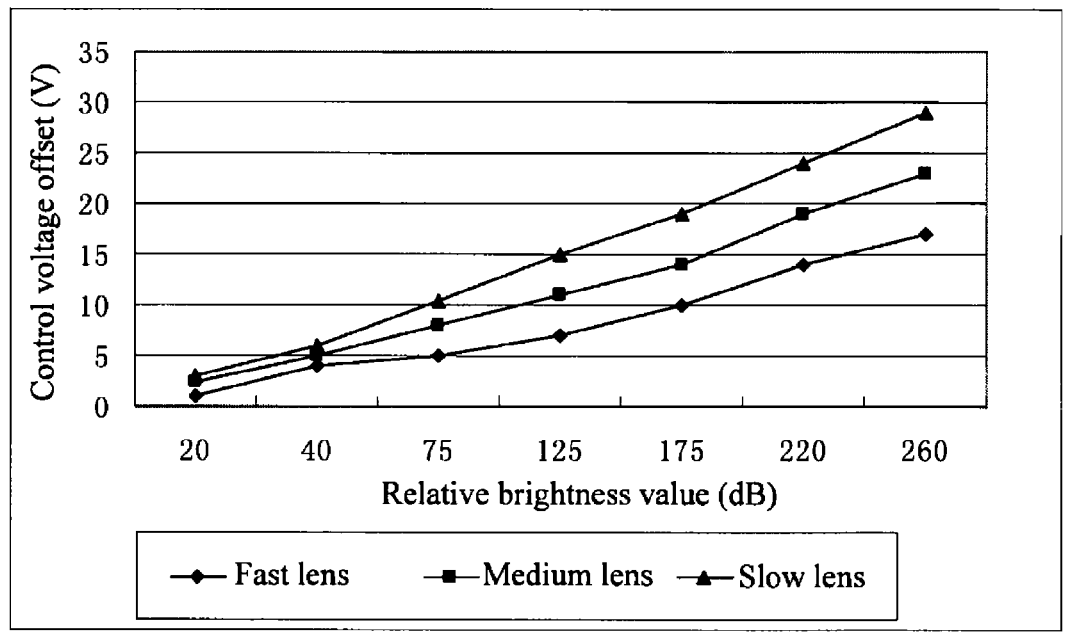
FIG. 8 is a schematic diagram illustrating various lens control models.

Lens control models may be classified in various ways. For example, they can be classified by categories or manufacturers of the lenses. In an embodiment, as illustrated in FIG. 8, in order to be adaptive to the iris characteristics of various lenses, according to response situations of each of the lenses on the optical imaging device, the lenses are classified into three categories of "Slow, Medium and Fast" and three iris control voltage curves are established (FIG. 8 only illustrates the first quadrant of the control voltage curves).

In a specific implementation, the lens category information may be a lens category that is inputted by a user himself, or alternatively may be a lens category that is recognized by the optical imaging device in an automatic detection manner.

The corresponding lens control model can be selected in various ways. In an embodiment, it may be selected by way of software programming, for example, by way of using a Single Chip Micyoco, a Micro Control Unit (MCU) or a Field Programmable Gate Array (FPGA) to run a program, etc. In another embodiment, the lens control model may be selected by way of a specific hardware circuit. Particularly, the specific hardware circuit may be a multiple selection unit, a comparator, a control unit circuit, etc. In a further embodiment, the lens control model may be selected by way of a combination of software and hardware.

According to the lens control model, when the control signal corresponding to the current status of the lens is applied to the lens, the control signal can be generated from the control information contained in the lens control model, where the control information may be any information for controlling the lens, such as the offset of the control voltage, the value of the control voltage, the value of the control current, etc.

The control signal may be generated by way of various types of hardware circuit, software programming, or combination of software and hardware.

In a specific implementation, the control signal can be applied to the lens after being processed by the lens control circuit. In an embodiment, as illustrated in FIG. 4, the lens control circuit particularly includes digital-to-analog conversion units 401 and 402, and an amplifier 403. The digital-to-analog conversion unit 401 is adapted to convert the digital signal of the stop reference signal into an analog signal, and the digital-to-analog conversion unit 402 is adapted to convert the digital signal of the voltage offset into an analog signal. The amplifier 403 is adapted to perform operation amplification for the analog values of the stop reference signal and the voltage offset signal, and to output the control voltage to adjust the lens 360. In this embodiment, the control voltage outputted from the amplifier 403 relates to the stop reference signal and the voltage offset signal outputted respectively from the digital-to-analog conversion units 401 and 402. Particularly, the voltage offset which may determine the voltage offset signal is information contained in the lens control model.

In another embodiment, the lens control circuit particularly includes digital-to-analog conversion units 501 and 502, and amplifiers 503 and 505. The digital-to-analog conversion unit 501 is adapted to convert the digital signal of the stop reference signal into an analog signal, and the digital-to-analog conversion unit 502 is adapted to convert the digital signal of the voltage offset into an analog signal. The amplifier 503 is adapted to perform operation amplification for the analog values of the stop reference signal and the voltage offset signal, and to output the control voltage to adjust the lens 360. The lens 360 outputs in real time a voltage feedback signal, and the amplifier 505 amplifies the feedback signal and then feeds it back to the voltage offset signal input end of the amplifier 503. Using the circuit structure having a negative feedback can more accurately adjust the control voltage outputted from the amplifier 503, thus to effectively control the lens 360.

In a further embodiment, as illustrated in FIG. 6, the lens control circuit particularly includes digital-to-analog conversion units 601 and 602, and amplifiers 603 and 605. The digital-to-analog conversion unit 601 is adapted to convert the digital signal of the stop reference signal into an analog signal, and the digital-to-analog conversion unit 602 is adapted to convert the digital signal of the voltage offset into an analog signal. The amplifier 603 is adapted to perform operation amplification for the analog values of the stop reference signal and the voltage offset signal, and to output the control voltage to adjust the lens 360. The lens 360 outputs in real time a voltage feedback signal, and the amplifier 605 amplifies the feedback signal and then feeds it back to the voltage offset signal input end of the amplifier 603. The lens 360 further outputs a stop voltage feedback signal to the stop reference signal input end of the amplifier 603. In this embodiment, two feedback signals are used to adjust the control voltage outputted from the amplifier 603, thus to accurately control the action of the lens 360.

In a further embodiment, the control signal of the lens can be adjusted according to the lens control model by way of software programming, for example, by way of using a Single Chip Micyoco, a Micro Control Unit (MCU) or a Field Programmable Gate Array (FPGA) to run a program, etc.

In a further embodiment, the control signal of the lens can be adjusted according to the lens control model by way of a combination of software and hardware. For example, the digital signals can be inputted by way of software programming, and the other signal amplification circuits can be implemented by way of a hardware circuit.

Taking the lens control circuit illustrated in FIG. 5 as an example, the control voltage of the lens is:

$$V_{IRIS\_DRV} = G_1 \cdot V_1 - G_2 \cdot V_{DAC\_STEP} \cdot \Delta n - G_3 \cdot V_3 \quad (3)$$

In the equation (3), $V_{DAC\_STEP}$ denotes the minimum interval at which the digital-to-analog conversion unit can output a voltage, $\Delta n$ denotes a software gain, and the gains $G_1$, $G_2$ and $G_3$ of the circuit are hardware gains. In order to ensure that the lens can operate normally, control voltages required by various categories of lenses constitute a voltage range, and the voltage range is just the target that the entire lens control circuit aims to achieve. When this target range is fixed, if the hardware gains are too large, then correspondingly, a range over which the software gain is allowed to change may be limited. For the reason that the software gain is changed discretely, such a limited range can not be covered well, and there may be a dilemma of "being too large if being incremented by 1, and being too small if not being incremented". Therefore, the amplitudes of the hardware gains $G_1$, $G_2$ and $G_3$ shall be controlled.

The lens control method of the above embodiment can be used to control various elements or performances of the lens, e.g. the above lens control method may be used to control the iris.

In an embodiment, the iris control method includes: selecting, according to lens category information, a corresponding iris control model; and applying to, according to the iris control model, an iris a control signal which control signal corresponds to a current status of the lens.

Specifically, various iris control models corresponding to different categories of lens are configured in the optical imaging device. When in operation, the optical imaging device selects a corresponding iris control model according to the category of the mounted lens, and controls the iris to open or close according to the selected iris control model.

Particularly, the iris control model represents a relationship between an iris control signal and an iris status. For example, it can be represented as the iris control voltage curve illustrated in FIG. 1 where the horizontal axis represents the relative brightness values, each of which is a difference between the current brightness level and the target brightness value, and the vertical axis represents the voltage offsets.

When in operation, the optical imaging device calculates the brightness of each frame of image and compares the brightness with the target brightness value having been set to obtain the relative brightness value, and then adjusts in real time the control voltage of the iris according to the selected iris control model to change the amount of incoming light of the iris.

In another embodiment, the iris control method further includes dynamically adjusting the iris control model described above. The dynamical adjustment refers to adjusting the currently-selected iris control model according to a setting of shutter speed and of exposure, so as to meet the convergence requirement of a general scenario and also to avoid occurrence of fast iris hunting to the maximum.

Exposure compensation can control the amount of exposure at any time, i.e. change the convergence target of the iris in the lens. The amount of exposure is determined by the luminance of environment, the light transmittance of the lens system, the shutter speed and the light transmittance of the iris, where the light transmittance of the iris can be represented by the equation (4):

$$\Phi = \frac{r^2}{R^2} \quad (4)$$

Particularly, r denotes the radius of the currently-opened light transmission area of the iris, and R denotes the radius of the light transmission area when the iris being totally open. When a exposure compensation of −2 EV or even −3 EV is utilized in the environment having an extremely high luminance, if the conventional shutter speed of 1/30~1/100 second is still used, then in order to control the amount of incoming light to be at a very low level, the iris may be in an ultimate state of almost being totally closed, i.e. 0<r<<R. In the ultimate state, even a very small action of the iris can result in a very large relative brightness value, thus may trigger a control voltage far away from the origin in the lens control model. If the curve is steep, there is a great possibility that the current brightness level (Video Level) may be continuously pushed back and forth by the large control voltage, i.e. fast iris hunting occurs.

In order to avoid iris hunting, in an environment having an extremely high luminance (e.g. shooting against the burning sun), when the conventional shutter speed is used and an exposure compensation below −2 EV is utilized, a flat lens control model curve shall be arranged. However, when the lens control model curve is too flat, i.e. the voltage offset is too small, not only the action of the iris in the lens is slowed down, but also two cases may occur: (1) when the convergence action of the iris in the lens is almost finished, i.e. the current brightness level (Video Level) is close to the convergence target, the voltage offset may be small, thus the iris may already stop its action before the current brightness level reaches the preset target; and (2) if the convergence action of the iris is from closing to opening, when case (1) occurs, the current brightness level keeps below the preset target, and when such an offset is beyond the range that can be tolerated by the lens control circuit and lasts for several seconds, the optical imaging device may determine that "the iris is already totally open, but the current brightness level has not reach the target yet". Then, the optical imaging device forces the lens to open totally, and this may result in the image to become bright all in a sudden and may cause convergence again. In some brighter circumstances, the inertia of the iris action may render the current brightness level to fall back to be below the preset target again, and at this time, there may be an endless loop and the slow iris hunting may appear.

FIG. 9 and FIG. 10 illustrate an embodiment of dynamically adjusting a lens control model. FIG. 9 illustrates the modes selected for given settings of shutter speed and of exposure. For example, when the shutter speed is 1/100 second and the exposure compensation is set to be −2 EV, mode 1 is selected. Further referring to FIG. 10, when the mode is selected, several points far away from the origin can be adjusted based on FIG. 10. As illustrated in FIG. 10, when the mode is selected as 1, the value of the voltage offset signal corresponding to the No. 162 point (the No. 158 point is nearest to the origin) is decreased by 1, and the values of the voltage offset signals corresponding to the No. 163 and No. 164 points are decreased by 2. Consequently, the dynamically adjusted lens control model is much more flattened in the portion far away from the origin. At the same time, the adjustment of the lens control model as illustrated in FIG. 10 is only with respect to 5 points on the curve which are far away from the origin, thus avoiding iris hunting and meanwhile avoiding the occurrence of problem resulted from too slow iris action near the convergence target, thereby solving the contradiction between slow iris hunting and exposure compensation.

Figure 11:
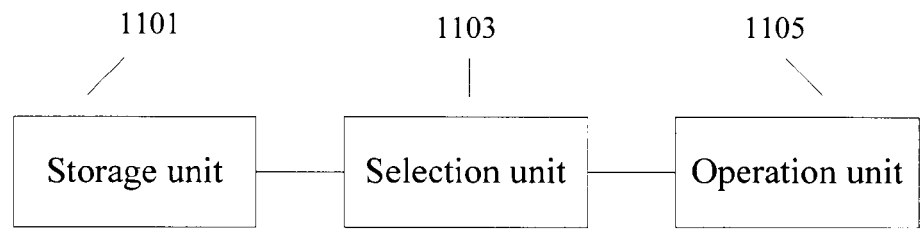
FIG. 11 to FIG. 13 are schematic diagrams illustrating embodiments of a lens control apparatus according to the invention.

Referring to FIG. 11, the invention further provides a lens control apparatus, which includes: a storage unit 1101, a selection unit 1103 and an operation unit 1105.

Particularly, the storage unit 1101 is adapted to store at least one lens control model; the selection unit 1103 is adapted to select, according to lens category information, a corresponding lens control model from the storage unit 1101, and to transfer a signal of the lens control model to an operation unit 1105; and the operation unit 1105 is adapted to apply to, according to the lens control model, a lens a control signal which control signal corresponds to a current status of the lens.

The lens control apparatus may vary in various ways. For example, referring to FIG. 12, in an embodiment, the lens control apparatus includes: a storage unit 1201, a selection unit 1203, an operation unit 1205 and an adjustment unit 1207.

Particularly, the storage unit 1201 is adapted to store at least one lens control model; the selection unit 1203 is adapted to select, according to lens category information, a corresponding lens control model from the storage unit 1201, and to transfer a signal of the lens control model to an operation unit 1205; the adjustment unit 1207 is adapted to dynamically adjusting the lens control model, and to transfer an adjustment signal to the operation unit 1205; and the operation unit 1205 is adapted to apply to, according to information provided in the lens control model and the adjustment signal of the lens control model outputted from the adjustment unit 1207, a lens a control signal which control signal corresponds to a current status of the lens.

Figure 13:
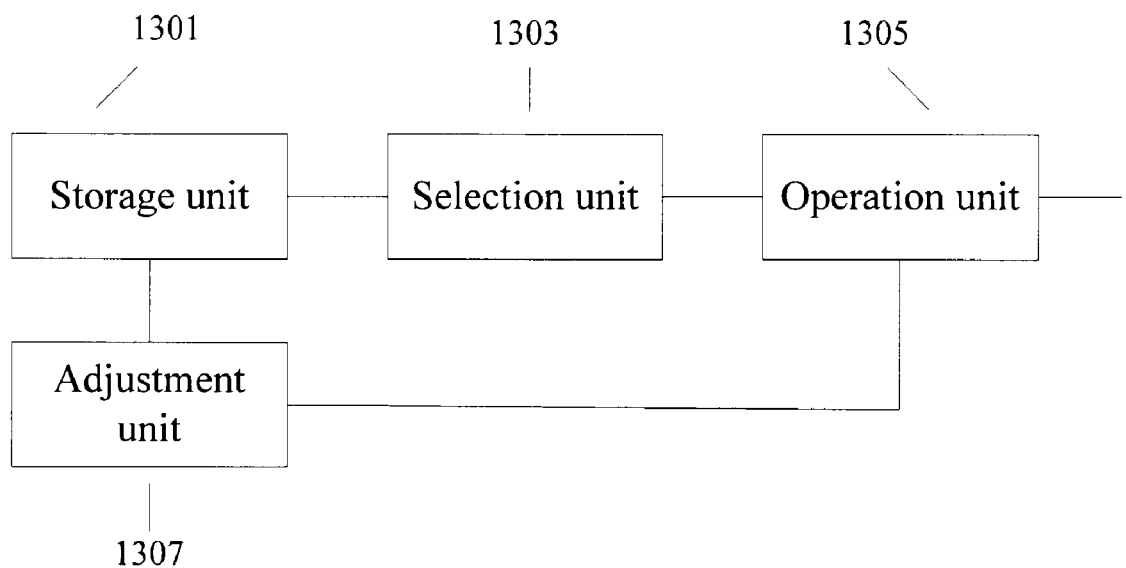

For another example with reference to FIG. 13, in yet another embodiment, the lens control apparatus includes: a storage unit 1301, a selection unit 1303, an operation unit 1305 and an adjustment unit 1307.

Particularly, the storage unit 1301 is adapted to store at least one lens control model; the selection unit 1303 is adapted to select, according to lens category information, a corresponding lens control model from the storage unit 1301, and to transfer a signal of the lens control model to an operation unit 1305; the operation unit 1305 is adapted to apply to, according to the lens control model, a lens a control signal which control signal corresponds to a current status of the lens, and to output the control signal to the adjustment unit 1307; and the adjustment unit 1307 is adapted to adjust, according to the control signal received from the operation unit 1305, the lens control model stored in the storage unit 1301.

Figure 12:
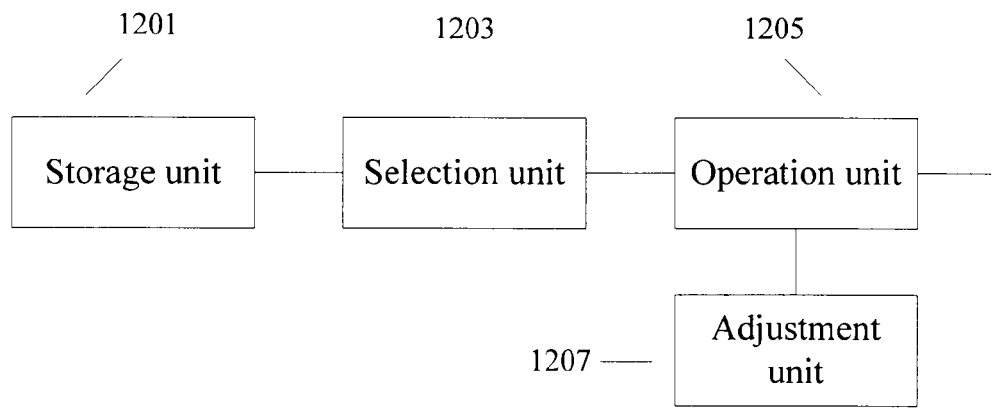

The lens control apparatus as illustrated in FIG. 11 to FIG. 13 can be implemented in a video camera apparatus having various interfaces. In an embodiment, the lens control apparatus can be implemented in an analog video camera apparatus having a coaxial BNC signal interface, a CVBS signal interface, an S terminal signal interface, an SCART signal interface, a D terminal signal interface, a YPbPr signal interface or a VGA interface.

In another embodiment, the lens control apparatus can alternatively be implemented in a digital video camera apparatus having a DVI, or HDMI interface.

In a further embodiment, the lens control apparatus can alternatively be implemented in an IP video camera apparatus having an Ethernet interface.

In a further embodiment, the lens control apparatus can alternatively be implemented in a video camera apparatus having a Wireless Lan, WiFi, WIMAX, or Bluetooth wireless communication interface.

In a further embodiment, the lens control apparatus can alternatively be implemented in a video camera apparatus having a USB interface.

In a further embodiment, the lens control apparatus can alternatively be implemented in a video camera apparatus having an IEEE 1394 interface.

The lens control apparatus as illustrated FIG. 11 to FIG. 13 can be implemented in various optical imaging systems, for example, a video camera for a broadcast television system, a video camera apparatus for a teleconference system, a digital camera, a medical optical imaging system, a research optical imaging system, a monitor video camera, a home camera product, etc.

The lens control apparatus as illustrated FIG. 11 to FIG. 13 can be implemented in various ways, for example, by way of a hardware circuit, software programming, or a combination of software and hardware.

Although the invention has been described in the above with the preferred embodiments, the invention is not limited to those. Any skilled in the art can make various alterations and modifications without departing from the spirit and scope of the invention. Accordingly, the scope of the invention is defined by the appended claims.

What is claimed is:

1. An optical imaging device, comprising:
an input unit, adapted to receive lens category information that is inputted;
a storage unit, adapted to store at least one lens control model;
a control unit, adapted to select, according to the lens category information that is inputted from the input unit, a corresponding lens control model from the storage unit, and to apply to a lens a control signal which control signal corresponds to a current status of the lens; and
a lens control circuit adapted to convert the control signal provided from the control unit into a control voltage used for controlling the lens,
wherein the control signal comprises a voltage offset and a stop reference signal, and the lens control circuit comprises:

a first digital-to-analog conversion unit, adapted to convert a digital signal of the stop reference signal into an analog signal;

a second digital-to-analog conversion unit, adapted to convert a digital signal of the voltage offset into an analog signal; and a first amplifier, adapted to perform operation amplification for the analog values of the stop reference signal and the voltage offset signal, and to output the control voltage.

2. The optical imaging device according to claim 1, wherein the lens control circuit further comprises:

a second amplifier, adapted to feed a voltage feedback signal that is output from the lens back to a voltage offset signal input end of the first amplifier.

3. The optical imaging device according to claim 1, wherein the lens control model comprises an iris control model adapted to represent a relationship between an iris control signal and an iris status.

4. The optical imaging device according to claim 3, wherein the iris control model is an iris control voltage curve.

5. A lens control method, comprising:

selecting, according to lens category information, a corresponding lens control model;

applying to, according to the lens control model, a lens a control signal which control signal corresponds to a current status of the lens; and adjusting, according to a setting of shutter speed and of exposure, the currently-selected lens control model.

6. The lens control method according to claim 5, wherein the lens category information is at least one of a lens category that is inputted from outside and a lens category that is recognized in an automatic detection manner.

7. The lens control method according to claim 5, wherein the lens control model comprises an iris control model adapted to represent a relationship between an iris control signal and an iris status.

8. The lens control method according to claim 7, wherein the iris control model is an iris control voltage curve.

9. The lens control method according to claim 5, wherein the adjusting the lens control model comprises:

selecting an adjustment mode which adjustment mode corresponds to information of the setting of shutter speed and of exposure; and updating the lens control model according to the selected mode.

10. A lens control apparatus, comprising:

a storage unit, adapted to store at least one lens control model;

a selection unit, adapted to select, according to lens category information, a corresponding lens control model from the storage unit, and to transfer a signal of the lens control model to an operation unit;

the operation unit, adapted to apply to, according to the lens control model, a lens a control signal which control signal corresponds to a current status of the lens; and an adjustment unit, adapted to dynamically adjust the lens control model, and to transfer an adjustment signal to the operation unit.

\* \* \* \* \*